No. 701,480. Patented June 3, 1902.
J. H. HARDIE.
POWER APPLYING AND TRANSMITTING APPARATUS.
(Application filed Nov. 24, 1900.)
(No Model.)
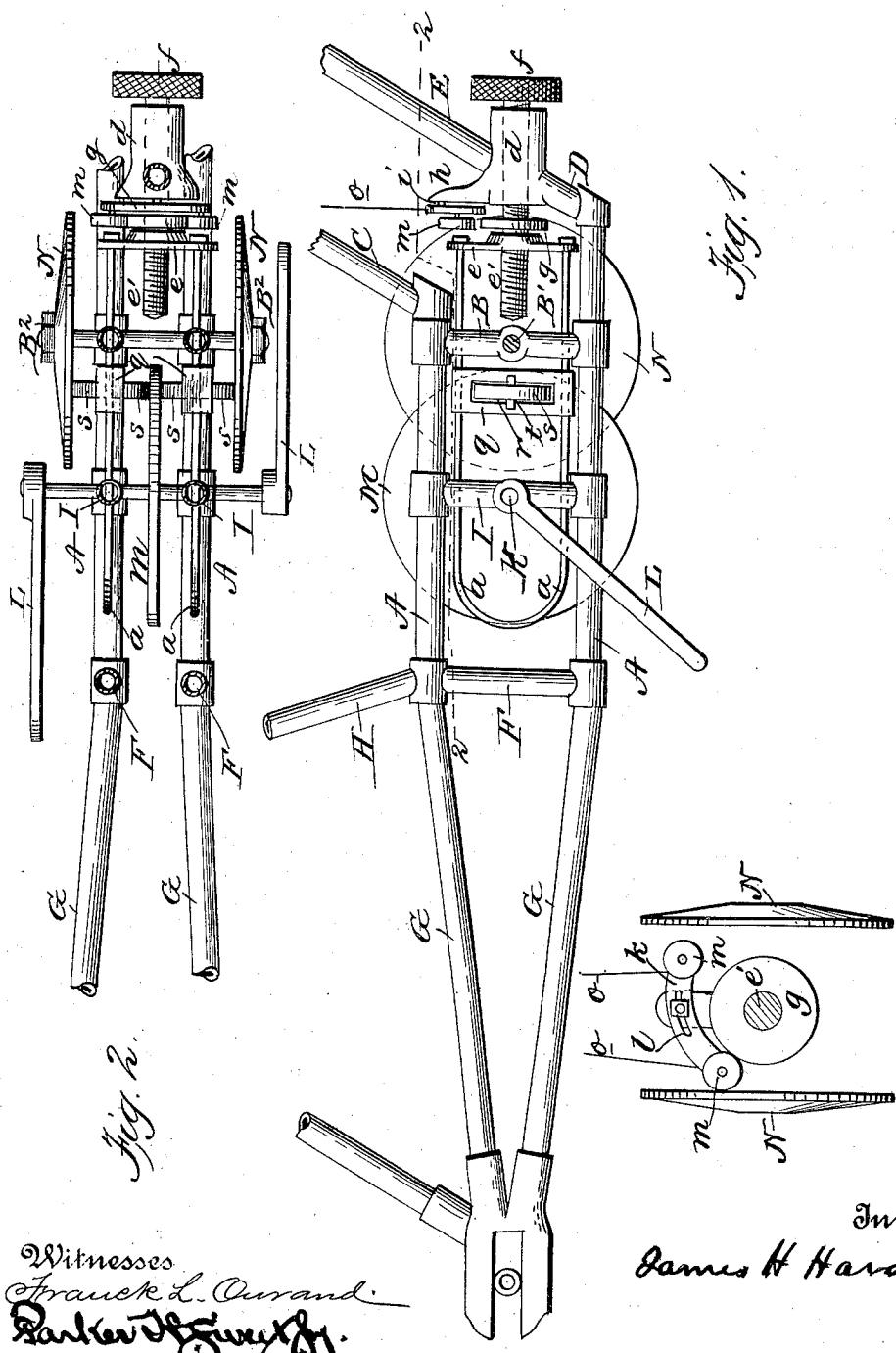
Witnesses
Franck L. Ourand
Parker H. [signature]
Inventor
James H. Hardie

United States Patent Office.

JAMES H. HARDIE, OF NEW YORK, N. Y.

POWER APPLYING AND TRANSMITTING APPARATUS.

SPECIFICATION forming part of Letters Patent No. 701,480, dated June 3, 1902.

Application filed November 24, 1900. Serial No. 37,637. (No model.)

*To all whom it may concern:*

Be it known that I, JAMES H. HARDIE, a citizen of the United States, residing at New York city, State of New York, have invented certain new and useful Improvements in Power Applying and Transmitting Apparatus; and I do hereby declare the following to be a full, clear, and exact description of the invention, such as will enable others skilled in the art to which it appertains to make and use the same.

My present invention relates to improvements in that class of power applying and transmitting apparatus wherein the speed of a power-transmitting shaft is increased or diminished while in motion without changing the revolution or speed of the shaft by which the power is supplied; and to this end my invention consists, essentially, of an improved frictional speed-gear, through or by which a supplemental shaft may be operated, as above stated, and said supplemental shaft being adapted to receive the desired speed or motion without changing or increasing the speed of the power-shaft.

The invention is fully disclosed in the following specification, of which the accompanying drawings form a part, in which—

Figure 1 is a sectional side view of my improved frictional speed-gear as applied to a bicycle; Fig. 2, a sectional top plan view thereof, taken on the line 2 2 of Fig. 1; Fig. 3, a detail view of one of the parts.

Similar letters of reference occurring on the several figures indicate like parts.

In the drawings forming part of this specification, reference being made to Figs. 1 and 2, I have shown a frame in which my improved frictional gear is mounted, and said frame consists of four horizontal tubular rods A, which are arranged as shown in said figures, the side rods on each side being connected near their forward ends by vertical tubular rods B, and to the upper rods A are secured upwardly-directed rods C, but one of which is shown, said rods C being carried upwardly and connected with the tubular head or sleeve, (not shown,) through which the guide-rod, which is connected with the forward fork of the bicycle, passes, and the lower rods A on each side are carried forwardly and inclined inwardly, as shown at D, and are connected with an upwardly-directed tubular rod E, which also connects with said tubular head or sleeve. The rear ends of the side rods A on each side are connected by vertical tubular rods F, and the said rods also connected by cross-rods G, and extending from this connection upwardly is a rod H, which extends upwardly to the set support, and the rods A on each side are carried backwardly to the support of the drive-wheel in the usual manner.

Between the vertical rods B, which connect the upper and lower rods A on each side, and the rear vertical rods F, which also connect said upper and lower rods, are vertical rods I, which connect the side rods A on each side about midway of their length, and passing transversely therethrough is the pedal-shaft K, provided with the usual pedal-cranks L, and mounted on said pedal-shaft and centrally thereof between the side rods A is a friction disk or wheel M, which is rigidly keyed to said shaft and revoluble therewith, and passing transversely through the vertical rods B, by which the side rods A are connected at their forward ends, is a shaft B', which is provided at each end with a friction disk or wheel N, and secured to one of said friction disks or wheels N on the side thereof is a sprocket-wheel, (not shown,) and if desired said friction disk or wheel N and the said sprocket-wheel may be formed integrally or cast in one piece, and I also prefer to provide means whereby the friction disks or wheels N may be longitudinally adjusted on the shaft B', and said friction disks or wheels are held in place on said shaft by nuts B², and said friction disks or wheels may be connected with said shaft by the usual spline or rib and groove, whereby said friction disks or wheels will be free to slide on the shaft, but being keyed thereto revolve therewith.

I also provide a frame which is composed of four longitudinal ribs a, two of which are arranged on each side, one above the other, their rear ends being joined together in the form of a semicircle, and said ribs on each side pass through the upper and lower portions of the vertical rods B and I, by which the side rods A are connected at or near their forward ends and at or near the middle thereof, and said ribs a are connected at their forward ends by a plate or head $e$, and secured to the upright rod E, which forms a part of the frame, is a tubular head $d$, through which passes a screw-threaded bolt $e'$, which is provided at its outer end with a milled head $f$, and mounted upon said screw-threaded bolt between the tubular head $d$ and the plate or head $b$ is a friction wheel or disk $g$. The inner end of the tubular head $d$ is provided with an upwardly-directed shoulder or projection $h$, and passing therethrough is a shaft $i$, on the inner end of which is secured a curved arm $k$, said arm being provided centrally with a curved slot $l$, through which the shaft $i$ passes, and the curved arm $k$ is provided at each end with a friction-roller $m$, and each of these rollers $m$ is adapted, under certain conditions, to bear upon and operate the friction-wheel $g$, which is mounted on the screw-threaded bolt or shaft $e'$, and connected with each end of the curved arm $k$ is a rope, cord, or chain O, as shown in Fig. 3. Mounted upon the ribs $a$ at each side of the central frictional disk or wheel M and rigidly secured thereto are blocks or frames $q$, and said blocks or frames are provided centrally thereof with vertical oblong openings $r$, in which are mounted friction rollers or wheels $s$, said friction rollers or wheels being provided with short shafts which are adapted to move in transverse slots $t$, formed in said blocks or frames, and when the parts are properly connected these friction wheels or rollers $s$ will come in contact with the opposite surfaces of the friction disks or wheels M and also with the inner surface of the friction disks or wheels N, and said friction rollers or wheels $s$ are arranged exactly opposite to each other and are always held in this position, and said friction disks or rollers $s$ are also held in this position by the disks or wheels M and N, said friction disks or rollers $s$ being free to slide laterally in their bearings. The object of thus arranging the friction wheels or rollers $s$ is to provide for perfectly counterbalancing all the parts and for properly counterbalancing the pressure which is applied to each side of the friction disk or wheel M, the points of contact between the friction disks or rollers $s$ and the disk or wheel M being directly opposite at all times. As thus constructed it will be apparent that the frame, which consists of the horizontal ribs $a$ and by which the blocks or frames $q$ are carried, is longitudinally adjustable and may be adjusted by means of the screw-threaded bolt or shaft $e'$ either by operating the milled head $f$ thereof or by means of the ropes, cords, or chains $o$, said ropes, cords, or chains being adapted to raise either end of the segmental arm $k$, and thus force the friction-rollers $m$ on the opposite end of the said arm between the adjacent disk or wheel N and the friction-wheel $g$, which will operate the shaft or bolt $e'$ in the manner already described.

As the frame which carries the blocks or frames $q$ is moved backwardly said blocks or frames are carried therewith, and the friction-rollers $s$ are also moved in the direction of the center of the disk or wheel M, and as said rollers move in the direction of the center of said disk or wheel the speed of the said wheels or rollers will be decreased, as will be readily understood, and as said rollers or wheels $s$ are moved outwardly in the direction of the perimeter of said disk or wheel M the speed thereof will be increased, as will also be understood.

The pressure of the disks or wheels N upon the friction rollers or wheels $s$ may be regulated at any time by the nuts $B^2$, and the object of this arrangement of the said wheels N is to provide means for taking up any slight wear that may occur between the various friction disks or wheels and the friction rollers or wheels in the operation of the apparatus.

In the practical use and operation of my improved device I prefer to make the disks N and M and the frictional rollers $m$ of hardened steel or other suitable metal.

Having thus described my invention, I claim as new and desire to secure by Letters Patent—

1. In a frictional speed-gearing of the class herein described, the rectangular frame composed of the longitudinal ribs $a$, two on each side, united together at their rear ends and having their front ends connected to the plate or head $e$; blocks or frames $q$ mounted on said ribs and carrying the friction-rollers $s$, in combination with an inclosing frame A, vertical rods I and B, central bearings for the reception of the power-applying shaft K, and power-transmitting shaft $B'$, respectively; friction disk or wheel M rigidly keyed to shaft K, friction disks or wheels N longitudinally adjusted and revoluble with shaft $B'$, and the screw-headed bolt $e'$, having milled head $f$, arranged in the tubular head $d$ and engaging with a correspondingly screw-threaded opening in the plate or head $e$ of the rectangular frame, substantially as specified.

2. In a frictional speed-gearing of the class herein described, the rectangular frame composed of the ribs $a$, head or plate $e$, and blocks or frames $q$ carrying the friction-rollers $s$, in combination with the screw-threaded bolt $e'$, located in the tubular head $d$, and engaging with a correspondingly screw-threaded opening in the plate or head $e$; said bolt $e'$ being adapted for operation through the medium of the friction-wheel $g$ located thereon, and the friction-rollers $m$ attached to curved arm $k$, and operating-cords $o$, substantially as specified.

3. In a frictional speed-gearing of the class herein described, the rectangular frame composed of the ribs $a$ and plate or head $e$, blocks or frames $q$, the friction-rollers $s$; said frame being capable of longitudinal adjustment in the main frame A through the medium of the screw-threaded bolt $e'$, arranged in the tubular head $d$, substantially as specified.

4. In a frictional speed-gearing of the class herein described, the curved arm $k$, friction-rollers $m$ and cords $o$, in combination with the friction-wheel $g$, and the screw-threaded bolt $e'$, whereby the rectangular frame is capable of longitudinal adjustment within its inclosing frame A, substantially as specified.

In testimony whereof I affix my signature in presence of two witnesses.

JAMES H. HARDIE.

Witnesses:
PARKER H. SWEET, Jr.,
FRANCK L. OURAND.